2,701,210

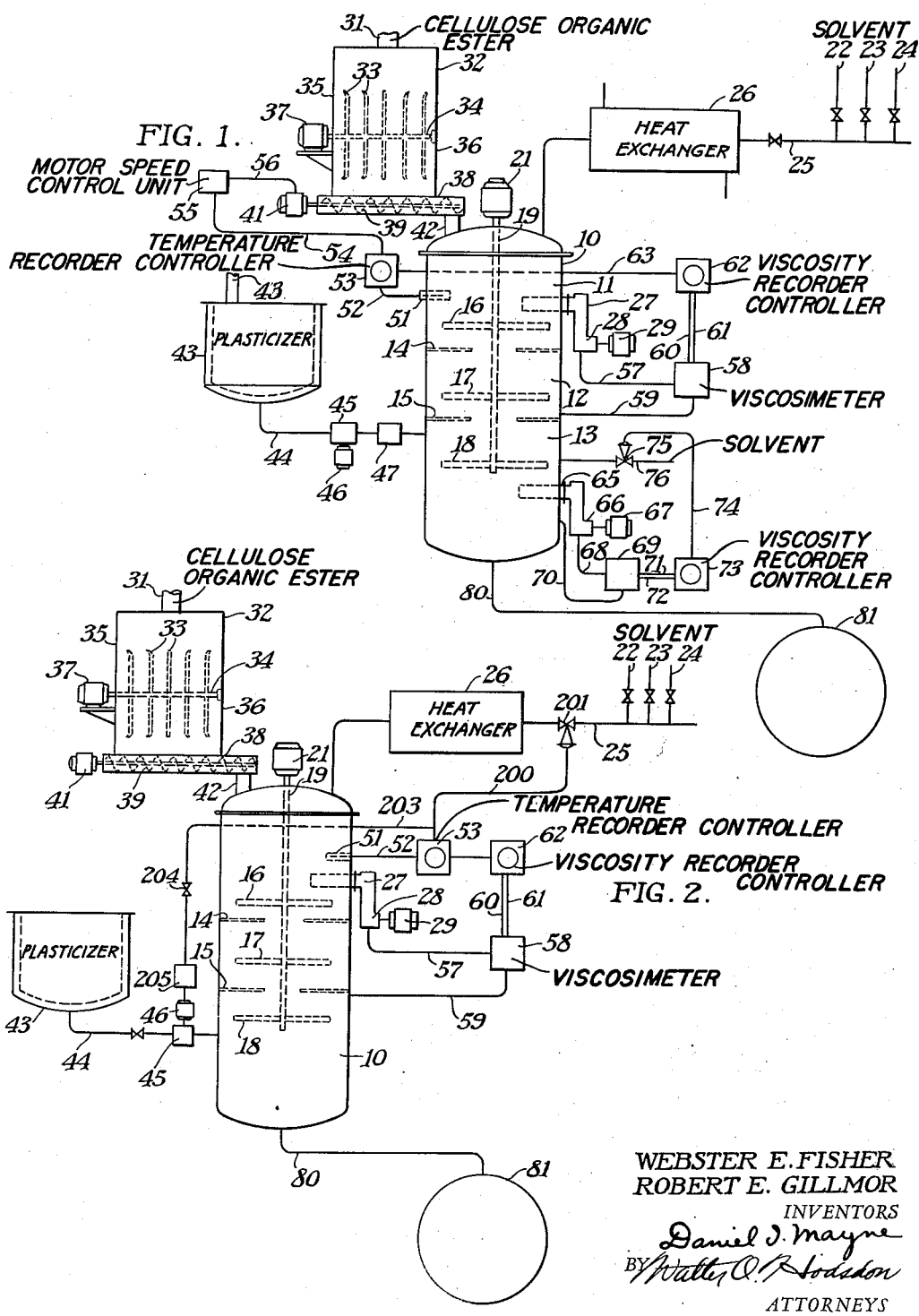

CONTINUOUS PROCESS FOR PREPARING A SOLUTION OF CONSTANT COMPOSITION

Webster E. Fisher and Robert E. Gillmor, Rochester, N. Y., assignors to Eastman Kodak Company, Rochester, N. Y., a corporation of New Jersey Application February 1, 1950, Serial No. 141,806

5 Claims. (Cl. 106—189)

This invention relates to a process for preparing high viscosity solutions having desired characteristics, and more particularly to a continuous process for preparing such viscous solutions having a predetermined viscosity from which film support, sheeting, yarn and filaments can be made. The invention is particularly adaptable for the preparation of solutions of relatively high viscosity such as solutions of macro-molecular substances including cellulose derivatives, for example, cellulose organic acid esters and ethers as well as polymeric resins and other high molecular weight polymers.

For many years solutions suitable for use in making photographic film support have been prepared by batch processes. In these processes a predetermined amount of film-forming material such as cellulose ester is added in a mixer to a predetermined amount of one or more solvents and, in some instances, one or more plasticizers, and thoroughly mixed together. Because the solvent, plasticizer and cellulose ester material are initially carefully proportioned, the final composition of the solution and its viscosity are usually within desirable limits. Such a process is disclosed, for example, in U. S. Patent 2,168,972 of August 8, 1939, to E. K. Carver. As there described the solution employed in the process is replenished by adding batchwise to the mixer, appropriate fixed amounts of the materials comprising the product solution, and the thus mixed solution is from time to time permitted to flow into the remaining solution-treating system, and thence to a film support coating machine. In practice more than one making mixer is employed so that the level of the solution in the coating machine system can be maintained quite constant by replenishment from the initial mixers.

As is evident from this prior practice, careful proportioning of the components of the solution composition must be made each time a mixer is charged. This requires considerable labor expense and is time consuming. It would be desirable, therefore, to make up solutions by a substantially automatic process which could be operated in a continuous manner. Heretofore, control of the characteristics of a solution being mixed by continuously measuring its viscosity has been attempted. It was found that an instrument response to viscosity may be obtained by pumping a portion of the solution through a viscosity-sensitive instrument such as a rotameter viscosimeter. However, in some instances, it was found that the response lag in such instruments is too great for this method to be used directly to control the solution viscosity within close limits. In connection with measuring the viscosity of cellulose esters, it has been found that this response lag is generally due to a combination of two factors. Cellulose esters dissolve slowly in organic solvents so that a change in ester feed rate in a continuous mixer gives a corresponding change in solution viscosity only after from one to twenty-five minutes, depending, of course, on the solution composition and the conditions of mixing. Also, in the initial section of a multi-stage continuous mixer there is generally a considerable lag introduced because the limited static head of the solution and its high viscosity necessitates large inlet pipes and a slow pumping rate in the solution-circulating pumps.

An object, therefore, of the present invention is the provision of a process for the continuous production of solutions such as are employed for forming film support and thin sheeting by coating methods, or for spinning into yarns and filaments by spinning processes.

Another object is a continuous process for forming solutions containing substantial amounts of one or more cellulose organic acid esters.

Still another object is a continuous process for forming solutions having predetermined viscosities and/or compositions.

Yet another object is a continuous process for forming solutions wherein close viscosity control and high feed rates can be maintained even though the rate of solvent and solid feed being added to a solution mixer fluctuates considerably. Still another object is a continuous process for forming cellulose ester solutions wherein close viscosity control can be maintained when the intrinsic viscosity of the cellulose ester varies from time to time. Other objects will appear hereinafter.

In accordance with one feature of the invention these and other objects are attained by a process which comprises continuously adding at a predetermined rate the solid material of the solution, such as cellulose organic acid ester, to the top section of a mixer, having a plurality of mixing sections, into which is added continuously at definite rates and constant temperatures, one or more solvents for the ester. The ester and solvent slowly mix under agitation to form a high viscosity solution of approximately the desired viscosity. This viscosity is maintained within desired limits by a control system which automatically increases or decreases the feed of the solid to the mixer depending on variance in feed, if any, of the constituents of the solution. The control system is based on the measurement of temperature and viscosity changes in the solution in the top section of the mixer.

Under any constant conditions of solvent feed rate, solvent temperatures, degree of agitation, and intrinsic ester viscosity, the temperature of the solution in the top section of the mixer varies directly with the cellulose ester feed rate. The rise in temperature between the weighted average temperature of the incoming solvent and ester and the solution temperature in the initial mixing section of the mixer is due to the heat of wetting of cellulose esters in organic solvent and to heat produced by agitation. The heat of wetting of cellulose ester with some solvents is, for example, approximately 25 B. t. u. per pound of ester. This heat is released immediately that the ester is wetted with solvent and, therefore, the temperature of the solution in the initial mixing section of the mixer is varied directly with the rate of ester addition before the ester has dissolved. The heat produced by agitation varies with solution viscosity in very high viscosity solutions. As a result of these two effects, we have found the temperature of the solution in the initial mixing section responds immediately to the rate of ester addition and more slowly after solution has taken place the temperature responds to the solution viscosity.

This temperature response which is dependent on solution viscosity is utilized in this continuous solution-forming process as a source of secondary control because the temperature of the solution in this initial section varies directly with the ester feed rate and solution viscosity, but is not directly proportional to the solution viscosity. Since the heat of wetting varies directly with the weight rate of ester feed, this feed rate, and thus the absolute amount of heat from wetting, must vary when the intrinsic ester viscosity varies in order to produce a solution of constant viscosity.

To employ these features to control the composition and viscosity of the product solution, a viscosimeter is connected to the top section of the mixer so that it is in fluid communication with the solution, a sample of which is continuously passed through the viscosimeter and returned to the mixer. The viscosimeter is adapted to be set for the optimum viscosity desired, also to measure the actual viscosity of the solution continuously passing therethrough and its temperature both of which may fluctuate during continuous production. Any variance from the optimum viscosity at the optimum temperature is suitably transmitted to a viscosity recorder controller. A thermoresponsive device, such as a thermocouple, is also installed in the top section of the mixer to measure the temperature of the solution. The solution temperature there measured is the sum of the temperature produced by the heat of solution and that produced by agitation of the solution. This composite temperature reading is transmitted to a temperature recorder controller which is also adapted to be set at an optimum temperature and in turn to regulate the rate at which the solids are introduced into the mixer in accordance with the difference between the measured and the optimum set-temperature. The set-point of the temperature recorder controller is set by the viscosity recorder controller which, as above stated, is actuated in accordance with viscosity variances from the optimum viscosity.

The temperature recorder controller immediately adjusts the cellulose ester feed mechanism for variations of the feed rate which are of a mechanical nature such as delivery variation due to changes in level in the storage hopper, partial packing or bridging of the cellulose ester in or above the delivery mechanism, etc. When employed with cellulose esters it also adjusts the rate of the ester delivery mechanism for changes in bulk density of the ester.

In accordance with another feature of the invention, the viscosity of the solution being continuously prepared can be controlled by employing the control system to vary the solvent input while the solid input into the mixer is maintained substantially constant. In this modification the output of the temperature recorder controller is employed to regulate the flow of one or more of the solvents by means, for example, of pressure-actuated valves. The viscosity of the completely mixed solution leaving the mixer is also measured continuously by a viscosimeter for the purpose of recording the production, and provision is made to lower automatically the viscosity of the product by adding solvent thereto.

While it is preferred to operate the method of forming the solution by having the set-point temperature of the temperature recorder controller automatically set by the variance in viscosity, it is within the scope of the invention to dispense with this automatic setting and merely regulate the set-point of the temperature recorder controller manually. In such event the set-point temperature would be constant for some substantial time period and the material feed, which may be either solid or solvent, as described above, would respond as the temperature of the solution being mixed varies from this constant set-point temperature. If the viscosity of the product solution drifted too far from the optimum, the operator would make proper manual adjustments of the set-point temperature.

The invention will be further understood by reference to the accompanying description and drawings in which:

Fig. 1 is a schematic drawing showing one system of apparatus for carrying out the process of the invention; by varying the feed of solid to the solution; and Fig. 2 is a schematic drawing of another apparatus system which may be advantageously employed to carry out the process of the invention in which the solvent and/or plasticizer addition to the solution is varied to control viscosity.

The invention which will be applicable for forming various types of solutions is here described in connection with the formation of a solution comprising cellulose acetate and solvents therefor.

Referring to Fig. 1 there is shown a mixer 10 adapted to be continuously operated, having three sections, an upper section 11, a middle section 12, and a lower section 13, plates 14 and 15 define the sections. Stirring paddles 16, 17 and 18, which are adapted to be rotated respectively in mixer sections, 11, 12 and 13, are mounted on shaft 19 which is driven by motor 21.

Solvents for the solution may be introduced into the mixer at a substantially constant rate and temperature through pipe 25 in which is positioned a heat exchanger 26 which is adapted to regulate the temperature of the solvent flowing therethrough. If it is desired to add a plurality of solvents to the mixer, they may be introduced, for example, into pipe 25 through pipes 22, 23 and 24.

The solid component of the solution, such as cellulose ester in the form of cellulose triacetate, is continuously supplied through conduit 31 to hopper 32 in which an agitator is positioned comprising a plurality of tridentate arms 33 mounted on a shaft 34 which is suitably supported in opposite hopper walls 35 and 36. The agitator is rotated by motor 37. The agitator aids in preventing the acetate from bridging in hopper 32 and the acetate travels into the screw conveyor 38 which is positioned into the bottom of the hopper. The screw 39 of the screw conveyor is rotated by motor 41 and conducts acetate through the conveyor to chute 42 and thence into the top section of mixer 10 where it becomes stirred with the solvent to form a viscous solution. The control for changing the rate of rotation of the conveyor screw 39 will be described subsequently.

Plasticizer, if desired, may be continuously introduced into mixer 10 from a jacketed kettle 43 through pipe 44 having a pump 45 and a flow meter 47 therein which is driven by motor 46. The plasticizer is continuously supplied to the kettle through conduit 48 and heated in the kettle, if necessary, to a flowable temperature. While, as shown, in the drawing the plasticizer is introduced into the lower section 13 of the mixer, if desired, it may be introduced into one of the other sections, or into more than one section, by providing additional pipes.

The method of controlling the composition and viscosity of the solution in mixer 10 will now be further explained. Assuming, for purposes of description, that the solution in mixer 10 is being continuously formed and mixed and is at the moment of the desired viscosity, and that the solution is being withdrawn from the mixer continuously through pipe 80 to tank 81, it will be found that as the process continues more or less solvent and plasticizer and more or less acetate than the optimum amounts will be conducted to the mixer. The viscosity of the solution will thus vary with this variance in material feed. Because of the changes in amounts of materials making up the solution, the heat of solution will also change, as will the heat produced in the solution by mechanical agitation, the latter varying as the viscosity of the solution changes. These variables are measured and employed to restore the solution to the optimum viscosity and this is now explained in detail.

Referring to mixer 10 a thermocouple 51 is shown installed in the wall of mixer 10 and is adapted to obtain the temperature of the solution in the upper section of the mixer. Current from the couple 51 flows through wires 52 and registers on the temperature recorder controller 53. The viscosity of the solution in the top section of the mixer is determined by a viscosimeter apparatus which comprises a member 27 extending into mixer 10 through which a sample portion of the solution is drawn into the viscosimeter system and forced therethrough by pump 28 which is driven by motor 29. The solution flows through pipe 57 to viscosimeter 58 and returns to mixer 10 through pipe 59. Viscosimeter 58 obtains the viscosity and temperature of the sample solution continuously passing therethrough and transmits these characteristics to a viscosity recorder controller 62 through respective pipes 60 and 61. The viscosity recorder controller 62 translates the pressure and temperature readings into pressure and through pipe 63 sets the temperature set-point on temperature recorder 53. If this set-point is greater than the temperature measured by the thermocouple 51 then more acetate should be introduced into the mixer and if the converse is the case, less acetate should be introduced into the mixer. In either event the temperature recorder controller gives out a pressure change through pipe 54 which acts on motor speed control unit 55 which, through wires 56, varies the speed of rotation of motor 41 and hence the speed of feed screw 39. The amount of acetate introduced into the mixer is thus controlled this resulting in solution viscosity control.

This solution flows progressively to the bottom of the mixer and on its downward flow is mixed with plasticizer entering the mixer through pipe 44.

The viscosity of this solution now containing the plasticizer is continuously measured by a viscosimeter system similar to that described above. The sample of solution is conducted from mixer 10 through member 65, pump 66, which is driven by motor 67, through pipe 68 to viscosimeter 69 and is returned through pipe 70 to the mixer 10. The viscosimeter 69 measures the viscosity and temperature of the sample solution and transmits these characteristics respectively through pipes 71 and 72 to viscosity recorder controller 73. The viscosity recorder controller 73 translates the pressure and temperature readings into pressure and through pipe 74 causes valve 75 in pipe 76 to open or close to some degree. Pipe 76 supplies additional solvent to mixer 10 so that the viscosity of the product solution can be reduced, if that is desired. The solution with its viscosity adjusted to a desired degree is withdrawn through pipe 80 to storage tank 81 from whence it may be supplied to a point of use such as a coating roll or spinnerette, and so on.

Referring to Fig. 2, a system for controlling the viscosity of a continuously mixed solution by varying the input of solvent is shown. Similar parts which are also shown in Fig. 1 bear the same numerals. As shown in Fig. 2, one or more solvents are introduced into pipe 25 through pipes 22, 23 and 24. These solvents flow through pipe 25, pressure-actuated valve 201, heat exchanger 26 to mixer 10. The acetate to be mixed with the solvent are continuously supplied through pipe 31 to hopper 32 and are supplied by the screw conveyor to mixer 10 through chute 42. In this modification of the invention the screw conveyor is run at a constant rate. As above explained, the feed of acetate will vary somewhat due to bridging, packing and the like. Also, the intrinsic viscosity of the acetate may vary from time to time. Accordingly, the resulting viscosity of the product will vary.

To compensate for this viscosity fluctuation, the solvent input is increased or decreased by a method now described. Referring to mixer 10 it will be seen that it is equipped with the continuous viscosimeter system comprising member 27, which serves to take out a continuous sample from the mixer, motor-driven pump 28, which forces the sample solution through pipe 57 to viscosimeter 58 and back through pipe 59 to mixer 10. The viscosimeter 58 continuously measures the viscosity and temperature of the sample and through pipes 60 and 61 transmits these variables to viscosity recorder controller 62. The controller 62 translates the pressure and temperature readings into pressure and through pipe 63 sets the temperature set-point on temperature recorder 53, which also measures the temperature of the solution in the mixer through thermocouple 51 and wires 52. If the set-point is greater than the temperature measured by the thermocouple 51 then less solvent should be added to the mixer 10, and if the converse is the case, more solvent should be introduced into the mixer. In either event the temperature recorder controller gives out a pressure change through pipe 200 which opens or shuts to some degree diaphragm valve 201. This valve 201 accordingly increases or restricts the solvent input into the mixer. The amount of solvent permitted to enter the mixer thus compensates for variations in acetate feed and permits the continuous production of a solution of desired viscosity which is withdrawn continuously through pipe 80 to storage tank 81.

Another modification of the invention is also disclosed in Fig. 2. It will be seen that plasticizer is introduced from kettle 43 through pipe 44 and pump 45 to mixer 10. In accordance with another feature of the invention, the speed of the motor 46 driving pump 45 is controlled through pipe 203 also by the output pressure from controller 53. Accordingly, the rate of plasticizer addition can be varied also in accordance with viscosity changes of the solution. By closing valve 204 in pipe 203, this variable control can be prevented from operation, in which case the plasticizer would be pumped into the mixer at substantially a constant rate.

As will be understood, various solvents and plasticizers could be employed which will give a solution satisfactory for a particular purpose. For example, the solvents could be methylene chloride, propylene chloride and methyl alcohol. One plasticizer could be triphenyl phosphate and the cellulose acetate employed could contain 42.5% to 44% acetyl and preferably 43.0–43.5% acetyl. The solids, solvent and plasticizer could be mixed together in the mixer to give the following solution composition:

*Example 1*

| | Parts |
|---|---|
| Cellulose acetate (43.5% acetyl) | 40 |
| Methylene chloride | 160 |
| Propylene chloride | 15 |
| Methyl alcohol | 15 |
| Triphenyl phosphate | 6 |

Another typical solution which may be continuously mixed by our novel process is the following:

*Example 2*

| | Parts |
|---|---|
| Cellulose acetate (40% acetyl) | 20 |
| Acetone | 60 |
| Diethyl phthalate | 5 |

The process of the instant application is also adaptable for preparing continuously the various solutions disclosed in Fordyce et al. applications Serial Nos. 707,807 and 707,808, both filed November 5, 1946, now respectively Patents 2,492,977 and 2,492,978 of January 3, 1950.

While the process is particularly suited for the preparation of solutions containing cellulose organic acid esters, such as cellulose acetate, cellulose propionate, cellulose butyrate and mixed esters such as cellulose acetate propionate and cellulose acetate butyrate, it is adaptable for preparing solutions of various resins which are employed in forming sheeting, film support, yarn and filaments.

What we claim and desire to secure by Letters Patent is:

1. A method of continuously preparing a solution of solid particles of cellulose acetate having an acetyl content of 42.5 to 44% in a solvent mixture of chlorinated hydrocarbon and a lower aliphatic alcohol, said solution having a predetermined desired constant composition which comprises continuously adding said cellulose acetate and said solvent to a mixing vessel, stirring the cellulose acetate into the solvent, measuring the temperature of the resultant solution, also measuring the viscosity of said solution, and gauging the further addition of at least one of said materials, said cellulose acetate and said solvent based on the aforesaid measurements of both the temperature and viscosity, said further addition being automatically controlled and made based on the aforesaid measurements of both the temperature and viscosity.

2. A method of continuously preparing a solution of solid particles of cellulose ester in a solvent, said solution having a predetermined desired constant composition which comprises continuously adding said cellulose ester and said solvent to a mixing vessel, stirring the cellulose ester into the solvent, measuring the temperature of the resultant solution, also measuring the viscosity of said solution, and gauging the further addition of the solvent based on the aforesaid measurements of both temperature and viscosity, said further addition being automatically controlled and made based on the aforesaid measurements of both the temperature and viscosity.

3. A method of continuously preparing a solution of solid particles of cellulose ester in a solvent mixture, said solution having a predetermined desired constant composition which comprises continuously adding said cellulose ester and said solvent to a mixing vessel, stirring the cellulose ester into the solvent, measuring the temperature of the resultant solution, also measuring the viscosity of said solution, and gauging the further addition of the ester based on the aforesaid measurements of both temperature and viscosity said further addition being automatically controlled and made based on the aforesaid measurements of both the temperature and viscosity.

4. A method of continuously preparing a solution of celllulose ester in a solvent therefor, said solution having a predetermined desired constant composition which comprises continuously adding said ester and solvent therefor to a mixing vessel and stirring to promote solution of the ester into the solvent, measuring the temperature of the resultant solution, also measuring the viscosity of said solution, and gauging the further addition of at least one of said materials based on the aforesaid measurements of both the temperature and viscosity, said further addition being automatically controlled and made based on the aforesaid measurements of both the temperature and viscosity.

5. A method of continuously preparing a solution of solid in a solvent therefor, said solution having a predetermined desired constant composition which comprises continuously adding said solid and solvent therefor to a mixing vessel and stirring to promote solution of the solid into the solvent, measuring the temperature of the resultant solution, also measuring the viscosity of said solution, and gauging the further addition of at least one of said materials based on the aforesaid measurements of both the temperature and viscosity, said further addition being automatically controlled and made based on the aforesaid measurements of both the temperature and viscosity.

References Cited in the file of this patent

UNITED STATES PATENTS

| | | |
|---|---|---|
| 331,242 | Hyatt | Nov. 24, 1885 |
| 331,713 | Hyatt | Dec. 1, 1885 |
| 2,057,019 | Evans | Oct. 13, 1936 |
| 2,513,562 | Holuba | July 4, 1950 |